Jan. 26, 1954
E. LANGBERG
2,667,590
MAXIMUM VOLTAGE SELECTOR
Filed Jan. 6, 1953
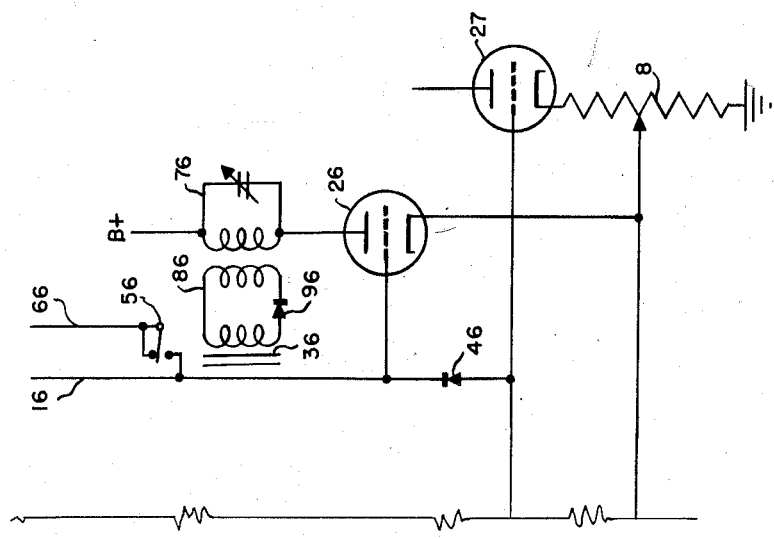
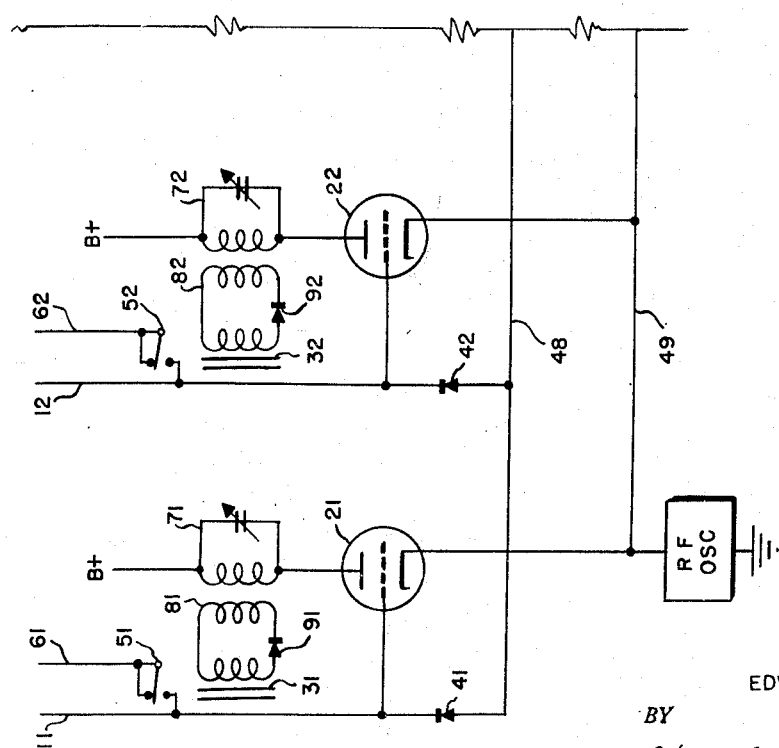
INVENTOR.
EDWIN LANGBERG
BY
Harry M. Saragovitz
Attorney Patented Jan. 26, 1954

2,667,590

UNITED STATES PATENT OFFICE 2,667,590

MAXIMUM VOLTAGE SELECTOR

Edwin Langberg, Philadelphia, Pa., assignor to the United States of America as represented by the Secretary of the Army Application January 6, 1953, Serial No. 329,760

3 Claims. (Cl. 307—80)

This invention relates to voltage level selecting devices and more particularly to indicators for identifying the maximum of a series of input voltages.

In the copending application of Octavio M. Salati, Serial No. 323,424, filed December 1, 1952, a system is described whereby a series of voltages are fed into a series of vacuum tubes connected by suitable circuitry so that the maximum incoming voltage actuates a relay or all the incoming voltages above a certain level actuate their respective relays.

It is an object of this invention to provide a highly sensitive A. C. detection means for use with this circuit.

It is an object of this invention to provide a highly sensitive detection means for use with D. C. level selecting circuits.

It is a further object of this invention to provide a D. C. level selecting device with a means for applying an A. C. to be transmitted by non-linear devices, amplified and detected to indicate a certain D. C. level.

Other and further objects of this invention will become apparent from the following specification and drawing which shows a preferred embodiment of this invention.

The drawing shows a series of D. C. voltage inputs 11, 12, and 16 which are applied to the grids of a series of tubes 21, 22 and 26. The cathodes of these tubes are connected to a common bus 49 to the cathode load impedance potentiometer 8 of a stabilizing tube 27 which is connected as a cathode follower. The input voltages may be connected through rectifiers 41 through 46 to a common bus 48 and to the grid of the cathode follower 27 to establish the voltage level of the cathode follower.

An R. F. oscillator may be coupled through a capacitor to the common cathodes of the tubes 21 through 26 and each plate circuit of these tubes may include a tuned circuit such as 71 through 76. These tuned circuits may be inductively coupled through coils 81 through 86 to detectors 91 through 96 and suitable relays 31 through 36 to actuate the corresponding switches 51 through 56 to connect the input sources 11 through 16 to corresponding output circuits 61 through 66.

In operation, a series of voltages are applied to respective inputs 11 through 16. If it is desired to determine which of said input voltages is maximum or connect the maximum input signal to any given output, the variable tap of potentiometer 8 is set at maximum or substantially the cathode voltage of tube 27. The maximum input voltage will draw the bus 48 and the grid of the tube 27 up to its voltage through a low impedance direction of the rectifiers and the cathode follower action of tube 27. The other, lower input voltages will be across the high impedance direction of the rectifiers and will not affect bus 48.

The cathode of the cathode follower 27 will be drawn up to substantially the voltage of the highest input and all of the cathodes of the tubes 21 through 26 are held at substantially the voltage of the highest input since they are coupled to the cathode of tube 27. This highest input voltage is at substantially the correct voltage to make its corresponding tube conduct while the other input voltages, being lower may maintain the other tubes in a substantially non-conducting state. The tube associated with the maximum voltage is in a conducting state and it acts as a grounded grid amplifier with respect to the A. C. signal applied to the cathode so that this particular tube builds up an R. F. potential in its plate circuit across the appropriate tuned circuit 71 through 76. These tuned circuits are inductively coupled to suitable detecting means so that the R. F. energy in an energized tuned circuit will induce a similar R. F. energy in a corresponding one of the coils 81 through 86 which will build up a D. C. through one of the rectifiers 91 through 96 across one of the relays 31 through 36. The relay is thereby actuated to close one of the switches 51 through 56 to connect the maximum voltage input line to a corresponding output circuit. The other output lines associated with non-conducting tubes will not be energized. If it is desired to determine the number of input voltages above a certain percentage of maximum, the common cathode bus bar 49 is set to the desired level on the potentiometer 8. In this case the input voltages above the percentage level will cause the corresponding tubes to conduct and will be connected to the appropriate outputs 61 through 66.

Other patterns of indication could also be obtained by varying the position of the potentiometer 8. The percentage of the maximum voltage could be a percentage of a fixed voltage supplied in one of the input circuits. Such a system would be useful for measuring the number of voltages lying above a certain percentage level to establish a probability curve.

While the R. F. energy is shown here in a cathode circuit of the tubes 21 to 26 it is apparent that the R. F. energy could be applied in other ways such as through the plate circuits or in series with the input voltages in manners well known in the art. The tubes 21 through 26 could obviously be pentodes. The R. F. energy used here could also be replaced by an alternating current of a lower frequency, in the audio or power range.

Within practical limits, any number of input stages such as the three shown here could be provided. The number of inputs could be further extended by other similar devices. In this case the highest D. C. signal could be compared with the highest of other similar groups to obtain the ultimate highest value. For this purpose the outputs 61 through 66 of each of several devices could be connected to a common bus bar for each device; the common bus bars being fed as inputs to an additional device and so on.

Rectifiers are shown here to detect the alternating current and apply it across a relay. There are several other ways of utilizing the energy detected from an alternating current source and any of such methods could be used here.

The vacuum tube used here could be replaced with other non-linear devices without effecting the basic principle of operation.

What is claimed is:

1. In a voltage sensitive device for comparing a plurality of voltages, a plurality of voltage inputs, a plurality of rectifiers, one pole of each of said rectifiers connected to one of said inputs, the other poles of said rectifiers connected together in a first common bus, a plurality of vacuum tubes having at least a grid, cathode and anode, the cathodes of said vacuum tubes connected together in a second common bus, one of said inputs, connected to a grid of each of said vacuum tubes, a source of alternating current connected to said second bus, an alternating current sensitive device connected to a plate of each of said vacuum tubes, a cathode follower having a potentiometer connected as the load impedance, said first bus connected to the grid of said cathode follower, said second bus connected to the voltage dividing tap of said potentiometer.

2. In a voltage sensitive device for comparing a plurality of voltages, a plurality of voltage inputs, a plurality of rectifiers, the positive terminals of said rectifiers connected to said inputs, the negative terminals of said rectifiers connected together in a first common bus, a plurality of vacuum tubes having at least a grid, cathode and anode, the cathodes of said vacuum tubes connected together in a second common bus, said inputs connected to the grids of said vacuum tubes, a source of alternating current connected to said second bus, a cathode follower having a potentiometer cathode load impedance, said first bus connected to the grid of said cathode follower, said second bus connected to the voltage dividing tap of said potentiometer, a plurality of tuned circuits responsive to the frequency of said alternating current, said tuned circuits connected in the plate circuits of said vacuum tubes, an alternating current detector coupled to each of said tuned circuits.

3. In a voltage sensitive device for comparing a plurality of voltages, a plurality of voltage inputs, a plurality of rectifiers, the positive terminals of said rectifiers connected to said inputs, the negative terminals of said rectifiers connected together in a first common bus, a cathode follower, said first common bus connected to the grid of said cathode follower, a voltage divider as the cathode load of said cathode follower, a plurality of vacuum tubes having at least a grid, cathode and anode, the cathodes of said vacuum tubes connected together in a second common bus to the voltage dividing tap of said voltage divider, one of said inputs connected to a grid of each of said vacuum tubes, a source of alternating current connected to said second bus, a tuned circuit responsive to the frequency of said alternating current connected to each of said plate circuits, a coil indutcively coupled to each of said tuned circuits, a rectifier and electromagnetic relay connected across each of said coils, a switch actuated by each of said relays, an output circuit associated with each of said relays, said switch connecting one of said inputs to a corresponding output circuit when actuated by said relay.

EDWIN LANGBERG.

No references cited.